Figure 1:
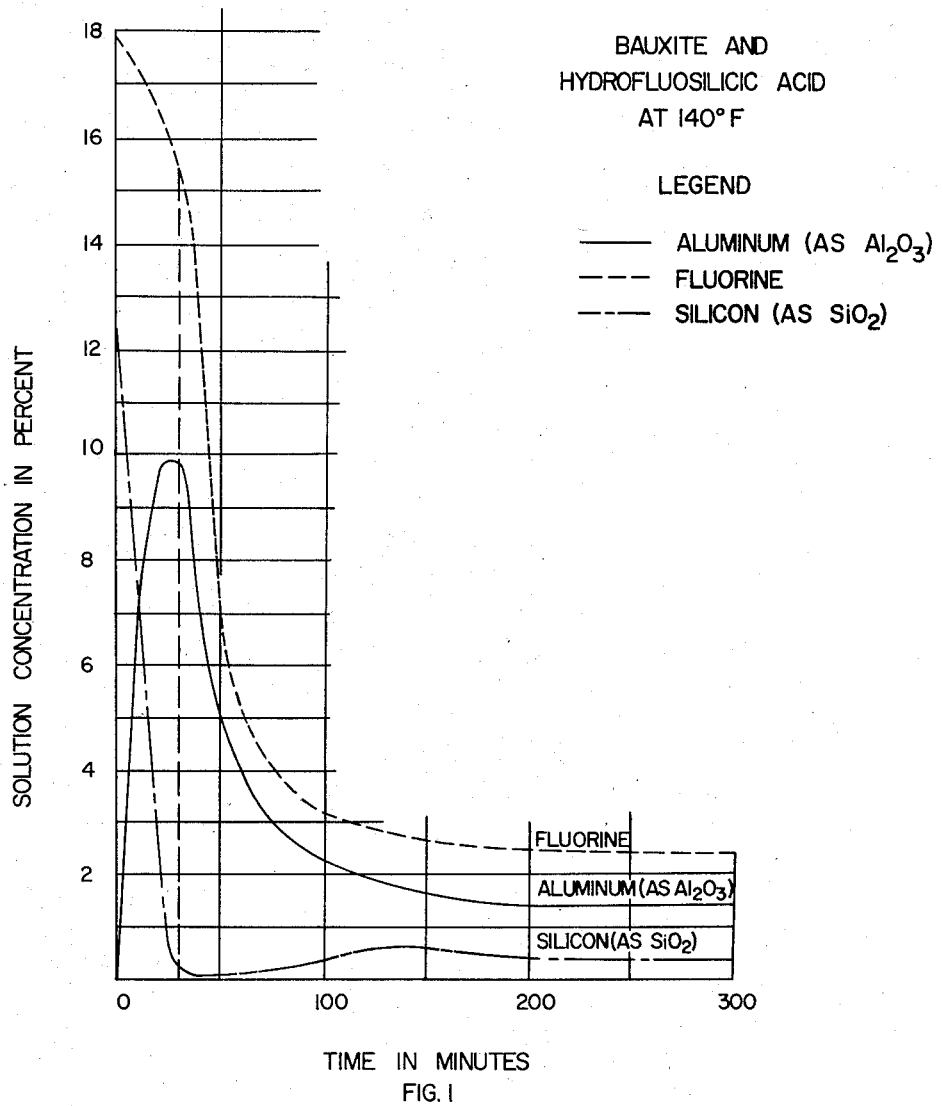

July 8, 1958     E. M. GLOCKER     2,842,426
ALUMINUM FLUORIDE MANUFACTURE
Filed Feb. 15, 1957     3 Sheets-Sheet 1

INVENTOR.
EDWIN M. GLOCKER
BY *Kenneth E. Prince*

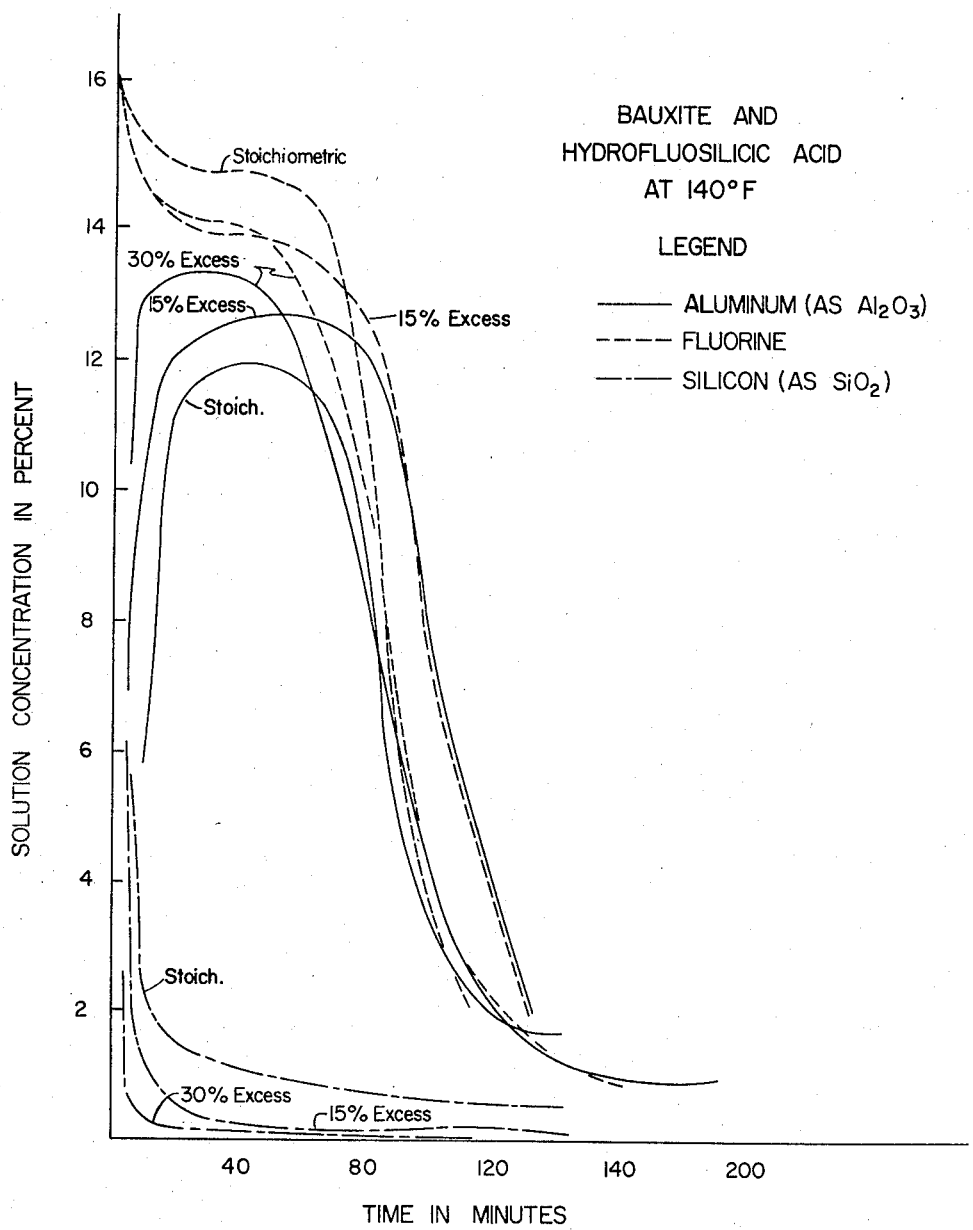

2,842,426
ALUMINUM FLUORIDE MANUFACTURE

Edwin M. Glocker, Baltimore, Md., assignor to W. R. Grace & Co., New York, N. Y., a corporation of Connecticut Application February 15, 1957, Serial No. 640,423

13 Claims. (Cl. 23—88)

The present invention relates to the manufacture of substantially pure aluminum fluoride by the reaction between bauxite and a fluorine-containing acid. It has particular reference to improvements in the preparation of aluminum fluoride whereby a substantially pure product can be obtained from impure starting materials contaminated, for example, with silica and iron impurities. In one specific embodiment, this invention relates to the recovery in high yield of substantially pure aluminum fluoride from the reaction of bauxite with impure hydrofluosilicic acid.

This application is a continuation-in-part of application Serial No. 299,938, filed July 21, 1952, which is, in turn, a continuation-in-part of application Serial No. 114,376, filed September 7, 1949, both of which applications are now abandoned.

The manufacture of aluminum fluoride commercially is presently carried out by the reaction of pure alumina or aluminum with pure hydrofluoric acid. The use of impure materials introduces contaminants into the product and degrades it or may even render it unfit for certain uses. For example, aluminum fluoride prepared by the usual method from impure aluminiferous material will usually contain sufficient iron and silica to render it completely unfit for use in the production of aluminum or ceramic bodies. Most commonly available starting materials, such as bauxite, contain considerable amounts of silica and iron, which are recovered along with the aluminum fluoride. Under present practice, this necessitates considerable refinement of starting materials at substantial expense.

U. S. Patents No. 1,391,172 and No. 1,403,183 state that aluminum fluoride can be manufactured by causing crude aluminiferous material to react with hydrofluoric or hydrofluosilicic acid and subsequently removing aluminum fluoride solution from the precipitated products of the reaction when the reaction mixture is neutral to tropeolin OO indicator. However, this process is not commercially feasible because the solutions ordinarily obtained are so dilute with respect to aluminum fluoride, being in the range of 1 to 3 percent, that it is uneconomical to carry out the evaporation to recover the salt. Also, the yield of product is very low, the best recoveries based on fluorine input being of the order of 60-65 percent. This represents a prohibitive loss of fluorine.

In accordance with the present invention, a method is now provided whereby a solution containing from 3 to 10 times the normal amount of aluminum fluoride can be obtained by reacting bauxite with hydrofluoric acid or hydrofluosilicic acid. The yield of product is very nearly theoretical and the aluminum fluoride obtained is substantially free of contaminants, which makes it eminently suitable for uses where a high purity aluminum is required. These improved results are possible at operating temperatures as much as 50% lower than those described in the prior art.

This invention is based on the discovery that, in the reaction between bauxite and a fluorine-containing acid to form aluminum fluoride, there is rapid formation of soluble aluminum fluoride and less rapid conversion of the soluble fluoride to an insoluble form. The rates of these reactions vary with the temperature as discussed below. Maximum recovery of pure aluminum fluoride is achieved by separating the liquid from the solids in the reaction mixture at the proper time. Simultaneously with the solubilizing of alumina, there occurs an initial rapid drop in the soluble silica in the reaction mixture, so that the silica content reaches a minimum at about the point of maximum solubility of aluminum fluoride. By timely separation of the liquid from the residue, there is obtained a liquid phase containing a maximum of aluminum fluoride and a minimum of silica.

One object of the present invention is to provide a method of manufacturing substantially pure aluminum fluoride by the reaction between bauxite and a fluorine-containing acid.

Another object is to provide a method of preparing aluminum fluoride from unrefined starting materials whereby the final product which separates from the reaction mixture is substantially free from undesirable contaminants, particularly silica and iron.

A further object is to provide a method of preparing aluminum fluoride from unrefined starting materials whereby a substantially pure product is obtained, the separation of aluminum fluoride being accomplished by filtration in the presence of impurities found in the starting materials.

A still further object of the invention is to provide a method of preparing pure aluminum fluoride by the reaction of bauxite with impure hydrofluoric acid or hydrofluosilicic acid without refinement of the starting materials prior to reaction.

Figure 2:
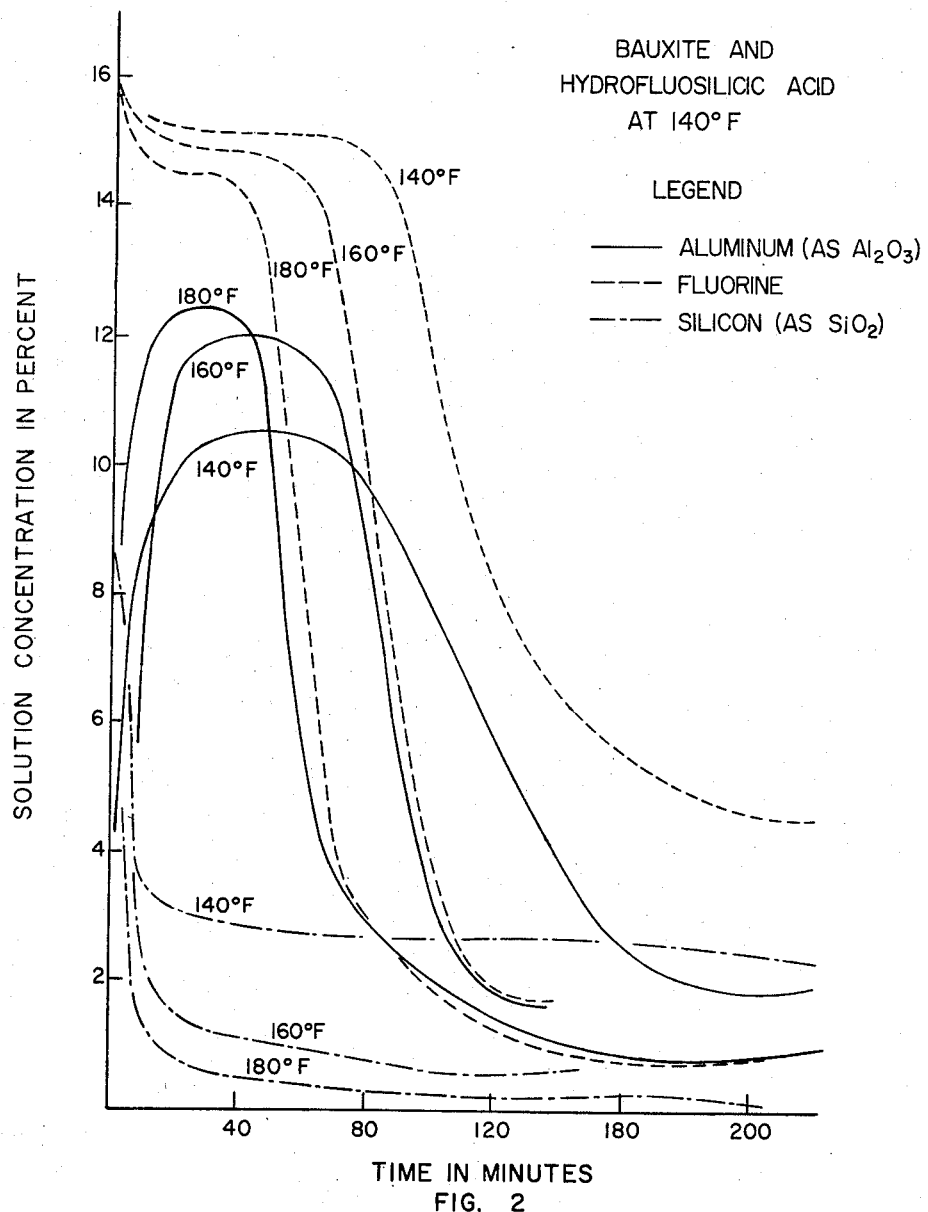

Other objects will be apparent from the following detailed description and drawings. Figure 1 is a diagram charting the relative quantities of the aluminum, fluorine and silicon in the liquid phase of a typical reaction mixture of bauxite and hydrofluosilicic acid against the time of reaction. Figure 2 is a diagram charting for three temperatures the relative quantities of the components in the liquid phase of typical reaction mixtures of bauxite and hydrofluosilicic acid against time of reaction. Figure 3 is a diagram charting for three acid-to-bauxite ratios the quantities of the components in the liquid phase against time of reaction.

In a specific embodiment the invention comprises the production of substantially pure aluminum fluoride by the reaction of bauxite with impure hydrofluosilicic acid. By filtering the reaction mixture at the proper time, the impurities are removed as solids, and the filtrate contains substantially pure aluminum fluoride in high yield. The heretofore essential steps of refining the starting materials and end products are eliminated, thereby effecting a substantial economy in the process.

The reaction between hydrofluosilicic acid and alumina proceeds according to the equation:

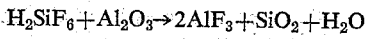

$$H_2SiF_6 + Al_2O_3 \rightarrow 2AlF_3 + SiO_2 + H_2O$$

The present invention is based on the phenomenon that aluminum fluoride may exist as a trihydrate in either the metastable soluble alpha or the insoluble beta form. In solution, alpha aluminum fluoride is converted to the beta form on aging. The solubility of beta aluminum fluoride in water is 0.41% at 25° C., which is less than one tenth the solubility of the metastable alpha form. As was previously stated, the above reaction first forms soluble alpha aluminum fluoride but, on standing, this material is converted to insoluble beta aluminum fluoride. In accordance with this invention, it has been discovered that a critical period occurs during the initial reaction wherein substantially all of the aluminum is present as alpha aluminum fluoride and nearly all of the silica is present as a precipitated solid. The insoluble impurities can be removed by separating the liquid and solid phases to obtain a clear solution of aluminum fluoride substantially free of silica. It is essential that the filtration be carried out at the critical point in the reaction. If the separation is made too early or too late, the resulting aluminum fluoride solution is relatively dilute and the process efficiency is low. The separated solids consist of silica, the original impurities of the starting materials, and beta aluminum fluoride.

In this application the critical point in the reaction is designated the point of maximum solubility of aluminum fluoride and is illustrated in Figure 1 of the drawing by the vertical broken line drawn through the highest point on the aluminum curve. The temperature at which the reaction is carried out has been found to be the most important factor in determining the time at which the point of maximum solubility will occur. As the temperature is increased, the dissolution reaction rate increases and the point of maximum solubility of aluminum fluoride is reached earlier. The rate of reversion to insoluble aluminum fluoride is not increased to the same extent as the dissolution, which means higher concentrations of aluminum fluoride are obtained at higher temperatures. This is clearly illustrated in Figure 2 which shows the correlation of time, temperature and concentration of products. The tests which developed the data from which these curves were drawn are described in Example II following.

Since a silica-free product is desired, care must be taken that there is always sufficient alumina present in the reaction mixture to use all of the fluosilicic acid. It is advisable to use a slight excess of alumina over the stoichiometric equivalent of fluosilicic acid. This insures that all of the fluosilicic acid will be used up and increases the yield. Figure 3 shows the effect of excess alumina on aluminum fluoride yield. It is preferred to use about 5% to 15% excess over the stoichiometric equivalent. This insures ready availability of sufficient alumina to react with all of the fluorine.

As indicated above, the most important factor in the control of the aluminum fluoride solubility is temperature. However, the use of excess bauxite, particle size of the bauxite, concentration of fluosilicic acid, and the peculiar, undefinable characteristics of the bauxite itself will cause some shifting of the curves without, however, causing any appreciable alteration in their shape. For this reason, it is not possible to state with mathematical exactness the time at which the critical point of the reaction will be reached. However, the point of maximum solubility is easily determined for a given set of reaction conditions by conducting a control reaction similar to those described in the examples below, from which, curves such as those shown in the drawings are constructed. To do this a sample of the bauxite is admixed with the acid at a controlled temperature. Samples of the reaction mass are withdrawn at regular intervals and analyzed as described. The analyses are plotted against elapsed reaction time to give a curve similar to those in the accompanying drawings from which the optimum reaction time can be easily read. This optimum time corresponds, of course, to the highest point of the curve.

In commercial operation, it is obvious that the operating cycle must be adjusted so that filtration can be carried out rapidly and immediately at this point. It is preferred to operate at temperatures in the upper end of the specified range in order to obtain maximum yield of product.

Within reasonable limits, the particle size of the bauxite is determined by the facilities available for grinding and sizing. Obviously, a fine size is preferable because mixing can be more easily and quickly accomplished. This is particularly important when working at higher temperatures because of the short time before the critical point in the reaction is reached. Generally, it is preferred to have the bauxite ground to about 40–200 mesh. With sizes larger than 40 mesh, the particles are too large for immediate reaction and the competing insolubilization reaction commences before the dissolution reaction is complete. Above about 200 mesh any advantage is so slight that it does not warrant the extra expense of grinding.

The present invention is further explained by the following examples.

EXAMPLE I

A commercial bauxite and fluosilicic acid from superphosphate manufacture were used as the starting materials. This bauxite analyzed as follows:

*Bauxite*

| | |
|---|---|
| $Al_2O_3$ | 58%. |
| $SiO_2$ | 13%. |
| $TiO_2$ | 2.5%. |
| $Fe_2O_3$ | 1.7%. |
| $H_2O$ | Balance. |
| Particle size | 90% thru 100 mesh. |

382 grams of 22.56% fluosilicic acid was placed in a 3-neck flask suspended in a thermostatically controlled water bath. The acid was brought to 140° F. and bauxite containing alumina stoichiometrically equivalent to the fluorine in the solution was added with stirring. The temperature rose rapidly to about 150° but was quickly reduced to 140° F. Samples of the reaction mixture were withdrawn periodically, immediately filtered, and the filtrate was analyzed for aluminum, fluorine and silicon. When the concentrations of fluorine, aluminum and silicon were correlated with the time intervals, the curves shown in Figure 1 were obtained.

It is observed that the maximum solubility of aluminum occurred about 30 minutes after the initial mixing. At this point the filtrate contained about 9.5% aluminum calculated as the anhydrous salt.

The aluminum fluoride end product analyzed as follows:

| | Percent |
|---|---|
| $Al_2O_3$ | 35 |
| F | 38 |
| $SiO_2$ | 0.050 |
| $TiO_2$ | 0.015 |
| $Fe_2O_3$ | 0.020 |

A material balance based on the analysis at the point of maximum solubility showed an aluminum fluoride recovery of about 90.3% based on fluorine content and 95% based on alumina content.

EXAMPLE II

Tests were run to compare the solubilities and recoveries at 140° F., 160° F., and 180° F. using a domestic bauxite of the following analysis:

| | Percent |
|---|---|
| Moisture at 105° C | 1.10. |
| T. V. at 1750° F | 26.83. |
| Alumina | 56.35. |
| Silica | 13.62. |
| $TiO_2$ | 2.09. |
| $Fe_2O_3$ | 0.86. |
| $P_2O_5$ | 0.12. |
| CaO | Less than 0.05. |
| MgO | Less than 0.05. |
| Fluorine | Less than 0.05. |

About 1360 grams (1150 ml.) of 20.8% impure fluosilicic acid was placed in a 1 liter 3-neck flask fitted with a stirrer and suspended in a thermostated water bath. When the acid was within about 40–50 degrees of the desired reaction temperature, 360 grams of the above bauxite, containing a slight excess alumina over that stoichiometrically equivalent to the fluosilicic acid, was rapidly mixed into the acid in the flask. The heat of reaction raised the temperature to the desired reaction temperature at which it was maintained. Samples, 30–50 ml., of the reaction mixture were removed at 15 minute intervals over a 200 minute period. The samples were quickly filtered on a weighed Büchner assembly which was then re-weighed to determine the weight of sample. The residue on the funnel was washed and the combined washings and filtrate analyzed for fluorine, aluminum and silicon.

Similar runs were made at 160° F., and at 180° F. The concentration of product in solution at each sampling time was plotted against the elapsed time. The resulting curves are shown in Figure 2.

The acid used in this test was production grade fluosilicic acid obtained from the acid recovery plant of a superphosphate acidulation process.

EXAMPLE III

In order to test the effect of excess bauxite on the results, replicate runs were made at 160° F. on the same material and in a similar manner to that described in Example II but using different quantities of bauxite. The predetermined time for filtering the mixture was 40 minutes.

In the first run, about 414 grams of bauxite (15% excess) was used and in the second about 468 grams (30% excess) was used. Samples were withdrawn at 15 minute intervals and were immediately filtered and analyzed as described in the foregoing Example II. The results of these runs were plotted against the elapsed time along with the 160° run described in Example II, representing stoichiometric bauxite. The resulting curves are shown graphically in Figure 3.

EXAMPLE IV

A comparison of the present method with other methods which have been suggested was obtained by the tests described hereafter. One run was made using an indicator to determine when to stop the reaction and another was made according to the method of the present invention whereby the reaction is stopped at a point of maximum solubility as determined from the curves of Figures 2 and 3.

In the first test, the reaction was considered complete when the mixture became neutral to tropeolin OO indicator. This method has been described in the prior art referred to above. The pH range for tropeolin OO indicator was determined by adding two drops of indicator to a measured quantity of 0.2 N sulfuric acid and titrating with 0.4 N sodium hydroxide solution. The acid solution was initially pink and it became lighter and lighter on the addition of caustic until it changed to a straw yellow color. The pH of the solution at the color change, as measured by a Beckmann pH meter, was ascertained to be 2.9. This solution was then back-titrated with 0.2 N sulfuric acid to the reverse color change, which occurred at a pH of 2.1. Lange's Handbook of Chemistry, 1949 edition, lists the pH range for this indicator as being 1.3 to 3.0.

2722 grams of fluosilicic acid (16.2% fluorine) was placed in a four liter beaker equipped with a stirrer and a Glasco heating mantle with a Variac control. When the temperature of the acid was about 115° F., approximately 700 grams of uncalcined Berbice bauxite (61.24% alumina), representing about 9% excess alumina, was added over a period of about 2 minutes. The temperature rapidly rose to the desired 170° F., the setting on the Variac control. The temperature was measured at 5 minute intervals throughout the reaction period. The average temperature for the entire period was ascertained to be about 170.7° F. Concomitantly with the temperature measurements, 20 ml. portions of the slurry were removed and tested with tropeolin OO indicator. These portions were immediately returned to the reaction mixture.

At the end of 40 minutes, the reaction mixture still tested acid to tropeolin OO. At this point the slurry was rapidly filtered and washed with about 2100 ml. of water. The total time for filtration and washing was about 7 minutes. The total filtrate and washings weighed about 4338 grams. A sample of the filtrate was tested with the indicator and ascertained to give the acid (pink) color. A sample of the filtrate was analyzed, from which it was determined that the filtrate contained 10.15% fluorine, representing a 99.5% yield of aluminum fluoride based on the fluorine in-put in the $H_2SiF_6$. The yield based on bauxite corrected for the excess alumina was 94.8%. The silica content of the filtrate was 0.23%.

A second slurry of bauxite and fluosilicic acid was prepared using a procedure identical with that described hereinabove. The average temperature during this reaction was 171.4° F. The reaction was allowed to continue until the sample portions treated with tropeolin OO changed from pink to yellow color, the neutral point of tropeolin OO as taught by the prior art. The elapsed time when the indicator changed was 75 minutes. The reaction mixture was then filtered and rapidly washed as described above. This filtrate weighed 3554 grams. Analysis of a sample, based on duplicated analytical results showed a fluorine content in the filtrate of 7.65, representing a 61.5% yield of aluminum fluoride based on fluorine in-put and a yield of 59.6% based on the alumina corrected for the excess. The silica content of the filtrate was 0.07%.

EXAMPLE V

To obtain a comparison of the reactivity of calcined bauxite with uncalcined bauxite, used in the preceding example, two runs were made on calcined bauxite in the same manner described in Example IV above, using tropeolin OO indicator to ascertain the time of completion of the reaction for one run and using for the other a time ascertained from the time-temperature curves of Figures 2 and 3.

2674 grams of fluosilicic acid (16.5% fluorine) was placed in a four liter beaker heated by a Glasco mantle as described in Example IV above. When the temperature was at about 115° F., 505 grams of bauxite, which had been calcined at 1004° F. for 8 hours and which by analysis was shown to contain 84.95% alumina, was added to the fluosilicic acid and rapidly admixed therewith during a period of about 2 minutes. This quantity of bauxite represents about a 9% excess of alumina over the stoichiometric quantity of acid. The reaction temperature, measured at 5 minute intervals throughout the run, averaged 170° F. Concomitantly with the temperature measurements, 20 ml. portions of the slurry were tested with tropeolin OO indicator. All of the portions tested were acid (pink) to the indicator. At the point of maximum solubility, determined from the curves aforesaid to be 40 minutes, the reaction mixture was rapidly filtered on a Büchner funnel and washed with 2100 ml. of water. A sample of the filtrate was tested with tropeolin OO indicator and ascertained to be acid. The total filtering and washing time was about 21 minutes. The total filtrate and washings weighed 4534 grams. A 50 gram sample was removed and analyzed for fluorine, alumina and silica. Based on the results of duplicate runs, the filtrate contained 9.7% fluorine, representing a 99.5% yield of aluminum fluoride based on fluorine in-put and a yield of 96.3% based on alumina corrected for the excess alumina. The filtrate contained 0.17% silica.

A second run was made using the same calcined bauxite and fluosilicic acid and a procedure identical with that described in the foregoing paragraph except that the reaction was allowed to continue until the mixture reached the tropeolin end point. The total time required was 97 minutes. The average temperature during the reaction was 170° F.

The slurry was filtered and rapidly washed as described above. The filtrate weighed 3665 grams. Analysis showed a fluorine content of 7.7% in the filtrate, which represented a yield of 64.0% based on fluorine in-put and a yield of 61.2% based on alumina corrected for the excess. The filtrate contained 0.17% silica.

The only differences observed between the uncalcined and calcined bauxite were a slightly longer filtration and washing period and slightly earlier tropeolin OO end point with the calcined bauxite. However, the yields obtained were identical.

In carrying out a process according to the present invention, it is preferred to operate in the range of 160–170° F. although operation at temperatures of 100–190° F. is contemplated. At 190° F., the reaction is extremely rapid and difficulty is experienced because of the short filtering time. At the lower temperatures, the reaction is undesirably slow. As seen from Figure 2 the yield at 160° F. is acceptable and gives sufficient time at the peak solubility to permit separation without appreciable loss due to insolubilization. In operating at these elevated temperatures, filtration of the solution from the gangue is relatively rapidly accomplished. It is important that the separation be made rapidly and immediately on reaching the point of maximum solubility. This may be done by dumping the entire mass, while still hot, onto a filter or centrifuge or other device for removing solids from liquids. Initial separation is followed with one or more washes with a minimum amount of water. Obviously, it is desirable to have as little water in the filtrate as possible since the aluminum fluoride must subsequently be removed from this solution.

After filtration and washing of the gangue, the aluminum fluoride solution is further processed to recover the aluminum fluoride. In some instances, it may be desirable to evaporate a portion of the water to facilitate crystallization. Stirring and heating with aluminum fluoride have been found to facilitate crystallization. Cooling the aluminum fluoride solution to about 0 to 8° C. will produce crystals of aluminum fluoride nonahydrate, which crystals melt at about 78–80° F. and, even at 0° C., will slowly revert to the trihydrate. The aluminum fluoride crystals are separated from the mother liquor by filtration, or other equivalent means, and are then dried to remove surface water or to convert to the anhydrous form if desired.

As stated above, it is desirable to use an amount of bauxite at least stoichiometrically equivalent to the fluosilicic acid. This insures recovery of all of the fluorine and a minimum of silica in the product. It is preferred to operate the present process with an excess of about 5 to 15% alumina in the reaction mixture. As seen from Figure 3, the use of excess alumina improves the yield somewhat and insures an initial rapid drop to a minimum silica content. Above about 15% excess the advantage to be gained by increasing the bauxite is relatively unimportant and does not warrant the cost of increasing the bauxite.

I claim:

1. A method for the manufacture of substantially pure aluminum fluoride in high yields comprising reacting bauxite and with not more than its stoichiometric equivalent of a fluorine containing acid from the group consisting of hydrofluoric and hydrofluosilicic acids and mixtures thereof at a temperature above about 100° F. and below 190° F., and separating the resulting liquid from unreacted solids at the point of maximum solubility of aluminum fluoride pre-determined for the specific reactants and conditions employed, thereby obtaining maximum recovery of substantially pure aluminum fluoride.

2. The method for obtaining a high yield of substantially pure aluminum fluoride by the reaction of silica-contaminated bauxite and a fluorine containing acid selected from the group consisting of hydrofluoric acid and hydrofluosilicic acid and mixtures thereof comprising the steps of mixing finely divided bauxite with not more than a stoichiometric equivalent of said fluorine-containing acids at a temperature of about 100–190° F. and separating the resulting insoluble residue from the aqueous aluminum fluoride solution after a pre-determined time interval ascertained for the particular conditions by correlating time with the total aluminum fluoride in solution, the terminus of said time interval corresponding to the point of maximum solubility.

3. A method for obtaining a high yield of substantially pure aluminum fluoride by the reaction of bauxite with a fluorine containing acid selected from the group consisting of hydrofluoric acid, hydrofluosilicic and and mixtures thereof, comprising the steps of mixing said fluorine containing acid with 100–130 percent of its stoichiometric equivalent of bauxite, maintaining the resulting mixture at a temperature of about 140–180° F. and separating the undissolved residue from the aqueous aluminum fluoride phase after a pre-determined time interval ascertained for the particular conditions of reaction by correlating the reaction time with the total aluminum fluoride in solution, the terminus of said time interval corresponding to the point of maximum content of aluminum fluoride dissolved in the aqueous phase.

4. A method for obtaining a high yield of aluminum fluoride substantially free of silica by the reaction of bauxite with a fluorine containing acid selected from group consisting of hydrofluoric acid, hydrofluosilicic acid and mixtures thereof, comprising mixing said acid with from 100–115 percent of its stoichiometric equivalent of finely divided bauxite, maintaining the reaction mixture at a temperature of about 140–190° F. and separating the unreacted solids from the liquid phase at the point of maximum solubility of aluminum fluoride pre-determined for the specific reactants and conditions employed.

5. A method of obtaining substantially pure aluminum fluoride from bauxite and fluosilicic acid comprising the steps of mixing with said acid from 100–130 percent of the stoichiometric equivalent of said acid of alumina in the form of finely divided bauxite, maintaining the reaction mixture of acid and bauxite at a temperature of about 140–190° F., rapidly separating the unreacted residue from the aluminum fluoride acid containing aqueous phase while still hot at the pre-determined point in the reaction corresponding to the point of maximum concentration of aluminum fluoride in the solution and crystalizing and separating the aluminum fluoride from the resulting aqueous phase, thereby obtaining an aluminum fluoride product substantially free of contaminants.

6. A method of obtaining soluble aluminum fluoride substantially free of silica by the reaction between finely divided bauxite and a fluorine-containing acid selected from the group consisting of hydrofluoric acid, hydrofluosilicic acid and mixtures thereof comprising the steps of intimately mixing finely divided bauxite with not more than its stoichiometric equivalent of said fluorine-containing acid at a temperature above 100° F. and below 190° F., and separating the insoluble residue from the aqueous aluminum fluoride solution after a predetermined time interval ascertained for the particular conditions by correlating the reaction time with the total aluminum fluoride in solution, the terminus of said time interval corresponding to the point of maximum solubility of aluminum fluoride.

7. A method of obtaining soluble aluminum fluoride substantially free of silica by the reaction between finely divided calcined bauxite and a fluorine-containing acid selected from the group consisting of hydrofluoric acid, hydrofluosilicic acid and mixtures thereof comprising the steps of intimately mixing finely divided calcined bauxite with not more than its stoichiometric equivalent of said fluorine-containing acid at a temperature above 100° F.

and below 190° F., and separating the insoluble residue from the aqueous aluminum fluoride solution after a predetermined time interval ascertained for the particular conditions by correlating the reaction time with the total aluminum fluoride in solution, the terminus of said time interval corresponding to the point of maximum solubility of aluminum fluoride.

8. A method for the manufacture of substantially pure aluminum fluoride solution to obtain maximum recovery thereof from finely ground uncalcined bauxite and hydrofluosilicic acid comprising intimately contacting said bauxite with not more than its stoichiometric equivalent of hydrofluosilicic acid of a concentration of about 20% at a temperature of about 140° F. and filtering solids from the liquid in the resulting mixture between about 20 and 40 minutes after the mixing of said bauxite and hydrofluosilicic acid, whereby maximum recovery of aluminum fluoride is achieved with minium contamination.

9. A method of obtaining soluble aluminum fluoride substantially free of silica by the reaction between finely divided bauxite and a fluorine-containing acid selected from the group consisting of hydrofluoric acid, hydrofluosilicic acid and mixtures thereof, comprising the steps of intimately mixing finely divided uncalcined bauxite with not more than its stoichiometric equivalent of said fluorine-containing acid at a temperature above 100° F. and below 190° F., and separating the insoluble residue from the aqueous aluminum fluoride solution after a predetermined time interval ascertained for the particular conditions by correlating the reaction time with the total aluminum fluoride in solution, the terminus of said time interval corresponding to the point of maximum solubility of aluminum fluoride.

10. The method set forth in claim 9 wherein the fluorine-containing acid is hydrofluosilicic acid.

11. A method of effecting maximum conversion of bauxite to soluble aluminum fluoride containing a minimum of silica comprising the steps of intimately mixing finely divided uncalcined bauxite with not more than its stoichiometric equivalent of hydrofluosilicic acid at a temperature above 100° F. and below 190° F., ascertaining under the specified conditions the point of maximum solubility of aluminum fluoride in the liquid phase of the reaction mixture, and separating the aluminum fluoride solution from the solid residue at said point.

12. A method of effecting maximum conversion of bauxite to soluble aluminum fluoride containing a minimum of silica comprising the steps of intimately mixing finely divided uncalcined bauxite with not more than its stoichiometric equivalent of hydrofluosilicic acid at a temperature above 100° F. and below 190° F., ascertaining under the specified conditions the point of maximum solubility of aluminum fluoride in the liquid phase of the reaction mixture, and separating the aluminum fluoride solution from the solid residue at said point without prior cooling of the reaction mixture.

13. A method for obtaining a high yield of soluble aluminum fluoride substantialy free of silica by the reaction between uncalcined bauxite and hydrofluosilicic acid, comprising the steps of intimately mixing finely divided uncalcined bauxite with not more than its stoichiometric equivalent of hydrofluosilicic acid at a temperature above 100° F. and below 190° F., correlating the reaction time with the total aluminum fluoride in solution to ascertain the point of maximum aluminum fluoride content for the specified conditions, and separating the insoluble residue from the aqueous aluminum fluoride at said point without prior cooling of the reaction mixture.

References Cited in the file of this patent

UNITED STATES PATENTS

| 508,796 | Ackermann | Nov. 14, 1893 |
| 1,403,183 | Milligan | Jan. 10, 1922 |

FOREIGN PATENTS

| 15,083 | Great Britain | of 1892 |